United States Patent [19]

Schley

[11] Patent Number: 5,096,141
[45] Date of Patent: Mar. 17, 1992

[54] AIRCRANE

[76] Inventor: Heinz K. Schley, 4310 N. 69th Pl., Scottsdale, Ariz. 85251

[21] Appl. No.: 426,551

[22] Filed: Oct. 23, 1989

Related U.S. Application Data

[63] Continuation-in-part of Ser. No. 30,971, Mar. 27, 1987, abandoned.

[51] Int. Cl.[5] .......................... B64B 1/34; B64B 1/62
[52] U.S. Cl. .................................... 244/25; 244/125; 244/97; 244/51; 244/127
[58] Field of Search ............ 244/25, 96, 97, 125–127, 244/52, 51, 30

[56] References Cited

U.S. PATENT DOCUMENTS

| | | | |
|---|---|---|---|
| 1,007,405 | 10/1911 | Wagner et al. | 244/125 |
| 1,109,502 | 9/1914 | Armstrong | 244/125 |
| 1,241,623 | 10/1917 | Gusey | 244/30 |
| 1,524,266 | 1/1925 | Longaker | 244/52 |
| 1,732,040 | 10/1929 | Edwards | 244/30 |
| 1,741,446 | 12/1929 | Turner | 244/97 |
| 4,032,086 | 6/1977 | Cooke | 244/30 |

FOREIGN PATENT DOCUMENTS 1117054  6/1968  United Kingdom .................. 244/30

*Primary Examiner*—Galen Barefoot

[57] ABSTRACT

An airship is described that shows a central rigid frame, extending the length of the airship, about which are arranged at least three equally spaced gas envelopes containing a lifting gas. Propulsion units are located at each end of the central frame and are controllably moved in different directions to control the airship. Also included on the airship is a hot air envelope above the lifting gas envelopes and provided with pivoting masts to increase and decrease the size of the hot air envelope.

7 Claims, 4 Drawing Sheets

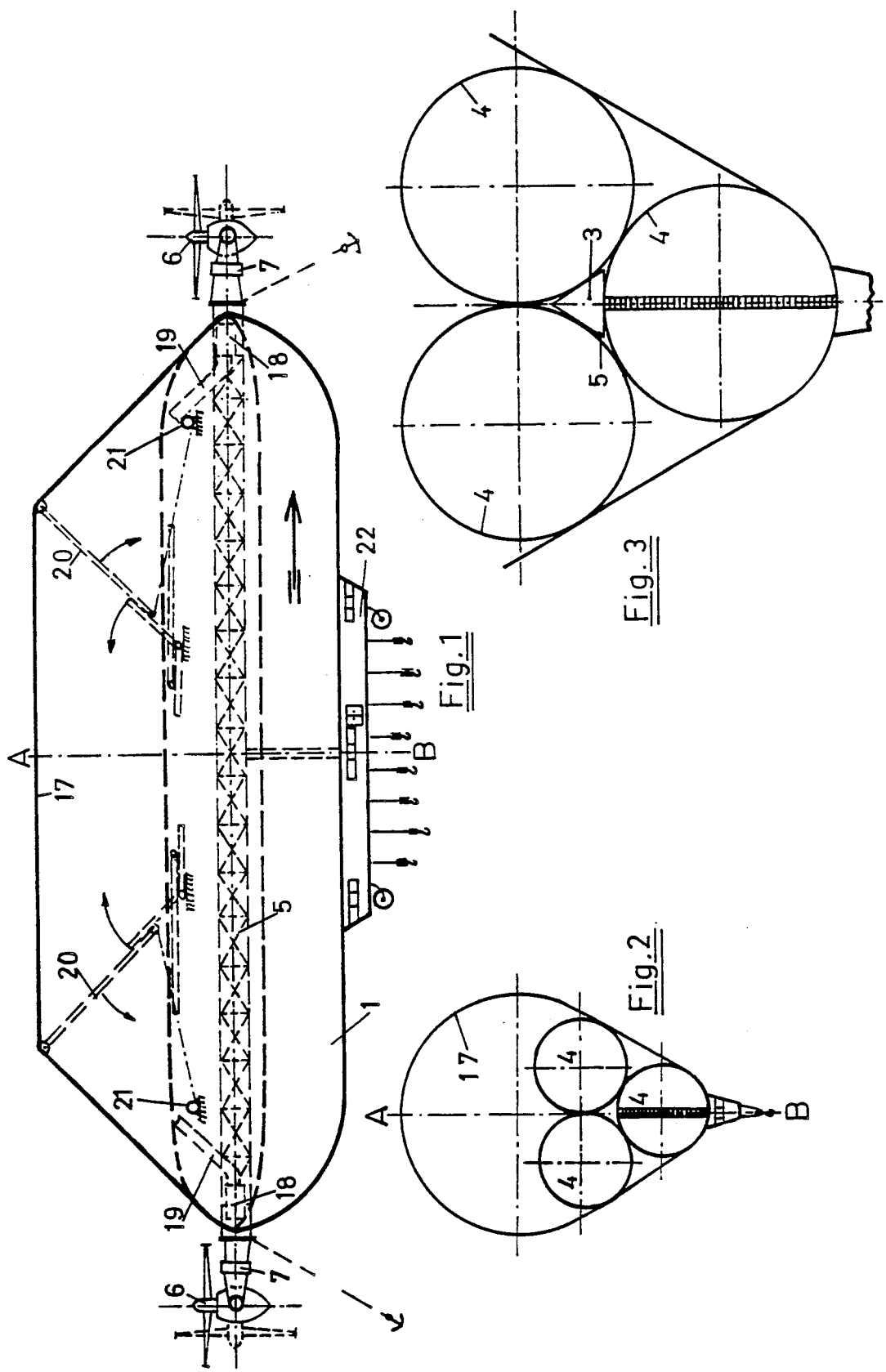

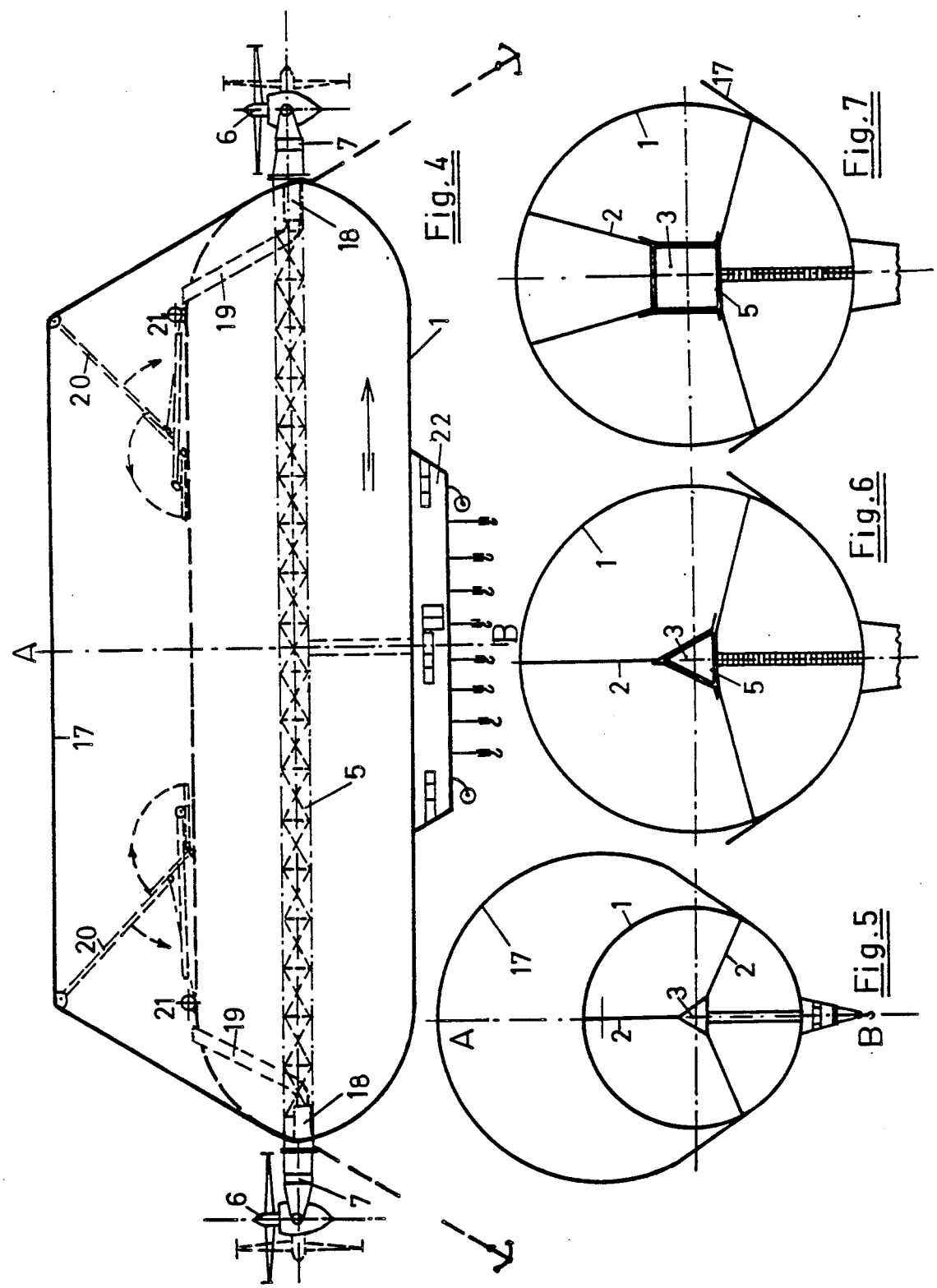

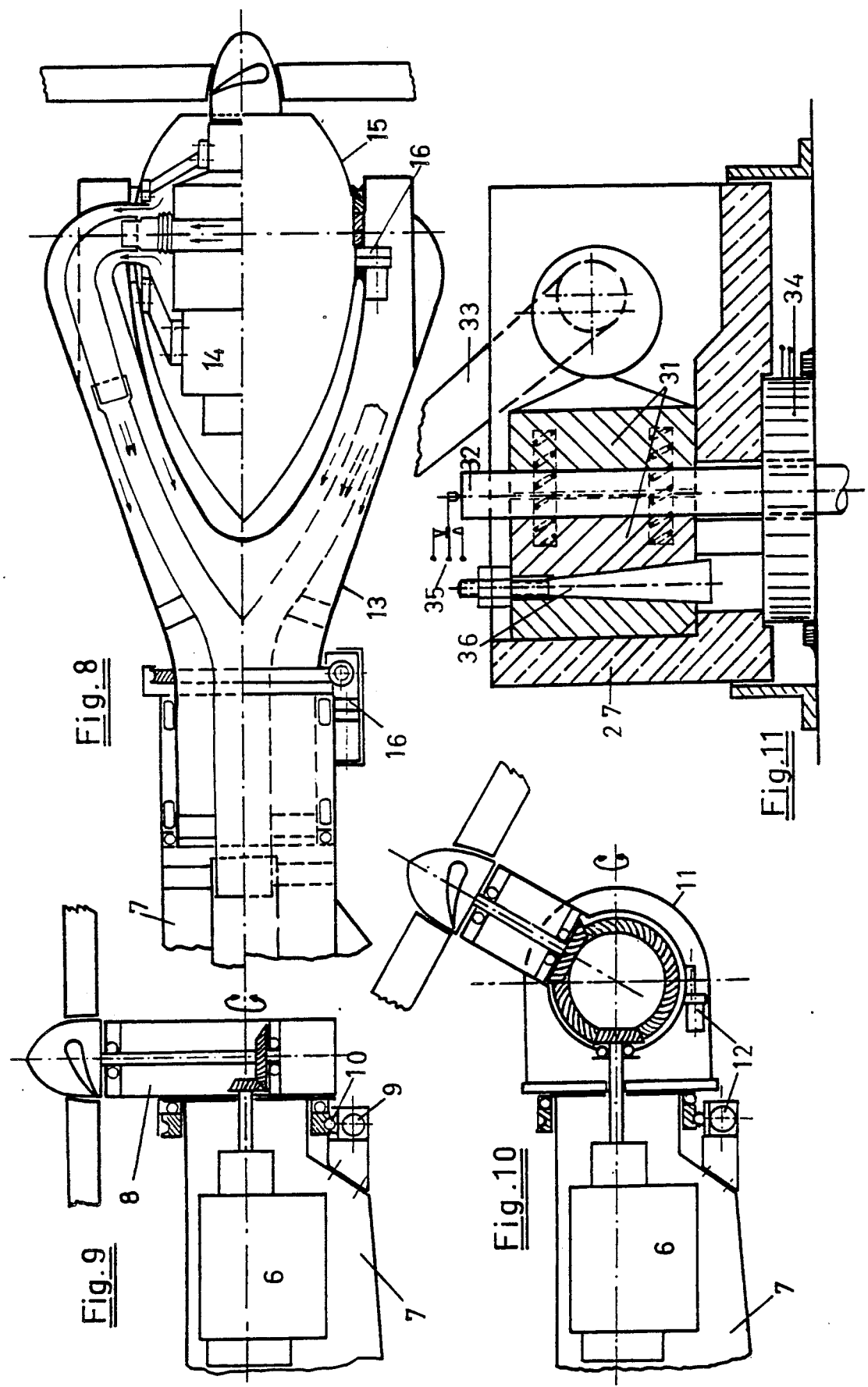

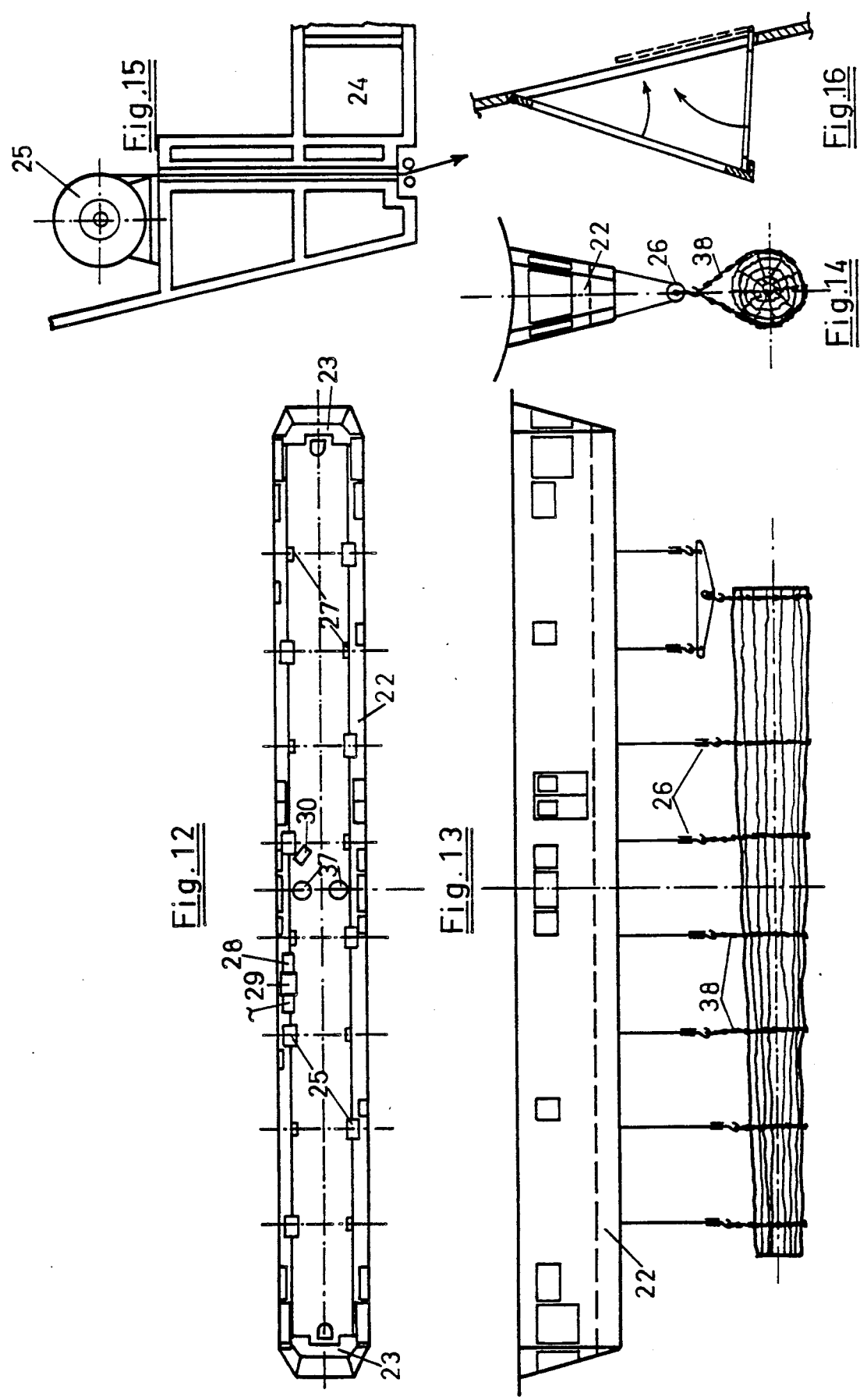

AIRCRANE

This application is a continuation-in-part of U.S. Ser. No. 07/030,971 filed Mar. 27, 1987 and now abandoned.

This invention relates to an airship, constructed according to the semi-rigid principle and is intended to economically remove fallen wood from remote areas and to transport containers, for example, to ships or off-shore platforms, etc.

In order to do this work, a very high maneuverability is necessary. For this reason this airship consists of lifting gas envelopes, an additional hot air cylinder as well as a cabin with several cable winches for hooking of trunks or containers and has a special engine arrangement for lifting and forward thrust.

The accompanying drawings illustrate the details of the aircrane as follows:

FIG. 1: longitudinal view of the aircrane with 3 gas envelopes

FIG. 2: cross section of the aircrane with 3 gas envelopes

FIG. 3: enlarged cross section with 3 gas envelopes

FIG. 4: longitudinal view of the aircrane with longitudinal walls

FIG. 5: cross section of the aircrane

FIG. 6: enlarged cross section of the gas envelope

FIG. 7: enlarged cross section of the aircrane with longitudinal walls

FIG. 8: fragmentary detail of the extension arm with fork mounted turbine

FIG. 9: fragmentary detail of the extension arm with helicopter rotor-head

FIG. 10: fragmentary detail of the extension arm with gear box

FIG. 11: section of the slip device

FIG. 12: top view of the cabin

FIG. 13: side view of the cabin

FIG. 14: front view of the cabin

FIG. 15: fragmentary cross section of the cabin

FIG. 16: fragmentary cross section of the swivel window.

DESCRIPTION

The airship body FIG. 1 (1) consists of 3 cylindrical gas envelopes (alternatively 4) FIG. 2 and 3 (4). They are joined together in a triangular (alternatively quadrangular) configuration, by which is formed in the center a gasfree compartment (3) over the whole ship's length.

The airship body according to FIG. 4,5,6,7 consists of only one gas envelope, but is divided through longitudinal walls (2) of a similar balloon material in a few separate self contained sections, forming in the center also a gasfree compartment (3) over the whole ship's length.

In this compartment is installed a lattice girder structure, made from glass-reinforced polyester (5). This part serves for the reinforcement of the ship body, so that the heavy weight of the cargo can be distributed safely into the soft envelopes. It serves also as a gangway where several apparatus for the ship's supervision and control are installed.

On both ends of the lattice girder structure are flanges for the engines to be mounted. Because of the high maneuverability, the engines must be mounted on the uttermost ends of the ship. For better efficiency, large slowly rotating propellers should be used. They are not only for forward thrust, but also for directing the ship and for lifting the cargo. Therefore, the thrust direction must be variable. For this reason, the propellers should be placed far enough from the ships peak so that in a horizontal position the blades don't hit the envelope. This is obtained by an adequately long extension arm (7) which is formed as a pipe with the turbine on the end.

Three different methods to alter the thrust direction are briefly explained as follows:

1. A fork (13) FIG. 8 that swivels is mounted in the end of the extension arm so that it can be moved from left to right about 200°. A complete turbo prop engine (14) encased within a streamlined housing (15) is mounted in this fork and can be tilted also about 180°, so that the propeller can work from upward over forward to downward. Hydraulic motors and worm gears (16) are used for the swivel and tilt movement.

2. On the end of the extension arm a helicopter rotor head with blades (FIG. 9), coupled with the turbine, is mounted in a box and fixed on a rotary plate (8). This head with its propeller can be turned by hydraulic motor (9) and worm gear (10) about 200° to the left and right side. The forward thrust is obtained through the blade tilt, as in the case of a helicopter.

3. On the end of the extension arm a swing and tilt gear box (11) with propeller FIG. 10 is attached on a rotary plate and coupled with the turbine. This gear box allows the propeller to swing from left to right about 200° and also simultaneously to tilt about 180° from top to bottom by means of 2 hydraulic motors with worm gears (12), so that it attains a semi-spherical thrust area and through thrust reversal a spherical thrust area.

Over the gas cylinders a big hot air envelope (17) from light hot air balloon fabric is fixed from one side to the other FIG. 1,2,4,5 with a volume equalling or bigger than the lifting gas volume in order to obtain an adequate additional buoyancy. Oil burners with blower and the exhaust gases from the turbine are used for the heating of the air. A temperature regulator (18) automatically maintains the temperatures to the degree the pilot desires, and prevents overheating. These apparatus are mounted on each end of the lattice girder structure and are joined with the hot air cylinder (19).

In order to stiffen the front and rear edges of the hot air envelope against the airstream, a folding mast of fiberglass (20) is mounted in each end of the envelope which, when the hot air cylinder is not in use, must fold down, so that the hot air cylinder can collapse. With the filling of the hot air envelope, the masts and the envelope, automatically, erect to a certain angle. Then a small cable winch (21) pulls the masts into the right position.

A long cabin (22) FIG. 12,13,14, made from composite material, is fixed on the underside of the envelope, which serves to pilot the airship. The ship must be able to be navigated forward and backward because of its special operations, therefore, it is built symmetrically and has 2 control stations (23), one on each end of the cabin. They are necessary during operations in areas difficult to access.

The steering of the ship is done by means of 2 ball sticks, one for each turbine. The movements of the sticks are electrically transmitted to the magnetic valves on the engines and activate the swinging and tilting of the propeller. Instruments on the control stations indicate the position of the propellers. With 2 other levers—throttle levers—the power of the turbines and the blade position of the propellers are regulated. Both control stations are connected with intercom. The cabin bottom is built as a double bottom (24) FIG. 15 to hold the ballast water, fuel, and on both ends retractable landing wheels.

Within the cabin, oil hydraulic cable winches (25) are mounted to the side walls on pedestals FIG. 15. They serve to affix to the ship the trunks or other cargo being transported and work with loose pulleys (26). The cable ends are fixed in special slip devices (27) on the opposite side of the winches FIG. 12. The winches are arranged alternately on the right and left in the cabin. An adjustable oil pump (28), driven by an auxiliary motor-generator (29) FIG. 12 delivers pressure oil for the winches, which are operated through a crane operator from a movable switchboard (30) by magnetic valves.

Each slip device FIG. 11 consists of a pair of clamp jaws (31), in which the cable end (32) is inserted and mechanically pressed together with a lever (33). By pulling the lever, the cable is released and slipped out. All levers are joined with steel cables and can be released by the pilot simultaneously in order to drop the hooked cargo in case of emergency.

The slip fixtures are mounted on top of electric pressure pickups (34), which indicate the load of the cables on instruments in the above mentioned switchboard. In addition, there are attached contacts (35), which are operated from the cable ends in such a way that warning lamps on the switchboard (30) flash, in case the cable is no longer in the correct position, i.e. if it has begun to slip into the clamp jaws, requiring clamp jaws readjustment (36).

A working place for the crane operator (37) is in the center of the cabin. On the right and left sides are windows which can be opened in swiveling form FIG. 16 in order to have a clear view downward. The above mentioned switchboard is also centrally located, which can be used from the right or the left window with the help of a flexible cable.

The lifting procedure of a cargo, for example a trunk, is done as follows: First of all, the center of gravity of the trunk has to be marked while it is lying on the ground. From this center point, the trunk should be marked on each side for the distances of the cable winches. Then the lifting chains (38) should be placed around the trunk at these marks FIG. 13.

The aircrane is then directed, over the trunk, with the winch-hooks completely extended down and the chains are hooked on. With a small oil pressure the winches retract the various looses of the chains. After that, the oil pressure has to be increased; therefore, the winches being to pull down the aircrane to the desired distance.

Then the aircrane pulls up by increasing the hot air temperature in the envelope and through upwardly directed propeller thrust. In case of very heavy cargo, a certain quantity of ballast water can, additionally, be drained off to obtain an auxiliary static buoyancy.

The unloading procedure is done in reverse sequence. Through hot air temperature decrease and reduction of the prop thrust, the ship descends over the planned unloading place, till the cargo (here a trunk) lies on the ground. Then the cable winches are released. Should the ship lift up, it has to be held down with negative prop thrust. Then all chains are unhooked and the ship is free.

It is a matter of course that all equipment, which is normally necessary for piloting of an airship (ballonetts, radio, navigation system, position lights, searchlight, etc.) should also be installed in this aircrane.

What I claim is:

1. An airship comprising a central frame about which are arranged at least three equally, radially spaced gas envelopes of balloon fabric, said envelopes containing a lifting gas, said central frame extends the full length of the airship to the fore and aft ends thereof and providing rigid support for the airship; mounting means on said fore and aft ends of said central frame for mounting propulsion means, said mounting means including a first support that is rotatably attached to one of said ends of said central frame and rotatable about an axis parallel to the length of said centered frame, said mounting means including a second support that rotatably mounts to said first support and mounts said propulsion means for pivotal movement about a second axis orthogonal to said first axis.

2. The airship of claim 1 wherein said first support is a swivable fork assembly including two arms to which is mounted at the ends thereof said second support and said propulsion means is a turboprop engine.

3. The airship of claim 2 wherein the said two arms of said fork are formed as ducts used to conduct the exhaust gases and cooling air from the tuboprop engine to a hot air envelope above said at least three envelopes, whereby the movements between said first and second supports occurs through the tubular ends of the said ducts fit into each other.

4. The airship of claim 1, wherein said central frame includes means to attach to the underside of the airship a long and narrow cabin of composite material containing complete control stations on each end, fuel and ballast water compartments, pedestals on both longitudinal sides for a specific number of hydraulic cable winches working with loose pulleys for the cargo, slip fixtures for the cable ends, said winches driven by an adjustable oilpump controlled by the crane operator from a movable switchboard by means of valves.

5. The airship of claim 4, wherein said slip fixtures comprise clamp jaws that are mechanically pressed together by means of levers to hold said cable ends from said winches, all said levers are connected together by control cables operated simultaneously in case of emergency, pressure pickups on said slip fixtures to transmit electrically the load on said cables to indicators on said switchboard and contacts to said cable ends to indicate correct position of said cable ends.

6. An airship comprising a central frame about which are arranged at least three equally, radially spaced gas envelopes of balloon fabric, said envelopes containing a lifting gas, said central frame extends the full length of the airship to the fore and aft ends thereof and providing rigid support for the airship, said airship further including a hot air envelope positioned centrally above said at three gas envelopes and extending substantially the length of said airship, said hot air envelope including folding light weight masts means located within said hot air envelope and including means for erecting said masts means to thereby expand said hot air envelope.

7. The airship of claim 6 including hot air temperature regulator apparatus on each end of the said central frame comprising ducts to said engines and to said hot air envelope, burners, fan, and means to regulate the temperature of the outgoing exhaust gases by the pilot.

* * * * *